United States Patent [19]

Chen et al.

[11] 3,720,923

[45] March 13, 1973

[54] OPTICAL MEMORY WITH REFERENCE CHANNEL TO COMPENSATE FOR DETERIORATION

[75] Inventors: Di Chen, Minnetonka; James Davis Zook, Burnsville, both of Minn.

[73] Assignee: Honeywell Inc., Minneapolis, Minn.

[22] Filed: July 6, 1971

[21] Appl. No.: 159,896

[52] U.S. Cl. ........340/173 LM, 178/15, 340/174 GA, 340/174 YC, 346/107 R, 350/160 R

[51] Int. Cl. .......G11c 13/04, G11c 29/00, G11c 7/00

[58] Field of Search..340/173 LM, 174 YC, 174 GA; 350/160 R; 346/107 R; 178/15

[56] References Cited

UNITED STATES PATENTS

| | | | |
|---|---|---|---|
| 3,072,889 | 1/1963 | Willcox | 340/173 LM |
| 3,614,189 | 10/1971 | Stewart | 340/173 LM |
| 3,629,517 | 12/1971 | Grimm | 340/173 LM |
| 3,188,907 | 6/1965 | Trampel | 340/173 LM |

*Primary Examiner*—Bernard Konick
*Assistant Examiner*—Stuart Hecker
*Attorney*—Lamont B. Koontz et al.

[57] ABSTRACT

A beam addressed optical mass memory utilizes an alterable memory medium which exhibits a change in its optical properties as a function of time or as a function of write-rewrite cycles. A reference bit is recorded on the memory medium and one or more information bits are similarly recorded. The reference and information bits are subjected to essentially the same number of write-rewrite cycles, and therefore exhibit essentially identical changes in optical properties. Information is read out by sequentially directing the light beam to the reference bit and the information bits. A detector produces a reference signal indicative of the intensity of the light beam received from the reference bit and produces information signals indicative of the intensity of the light beam from each of the information bits. The reference signal is directed to a reference channel and temporarily stored. Each of the information signals is directed to an information channel. The reference signal is compared to each of the information signals and readout signals are produced which are indicative of the difference between or the ratio of the reference signal and each of the information signals.

9 Claims, 10 Drawing Figures

INVENTOR.
DI CHEN
JAMES DAVID ZOOK
BY
ATTORNEY Osmund R. Dahle

*INVENTOR.*
DI CHEN
JAMES DAVID ZOOK
*BY*
ATTORNEY Omund R Dahle

*INVENTOR.*
DI CHEN
JAMES DAVID ZOOK
*BY*
ATTORNEY Osmund R. Dahle

INVENTOR.
DI CHEN
JAMES DAVID ZOOK
BY
ATTORNEY Omund R. Dahle

OPTICAL MEMORY WITH REFERENCE CHANNEL TO COMPENSATE FOR DETERIORATION

BACKGROUND OF THE INVENTION

The present invention relates to an information storage system. More particularly, the present invention relates to a beam addressed optical mass memory in which erasable reference and information bits are stored on a memory medium.

The ever increasing needs for the storage of large quantities of data in modern computer systems have required the development of new techniques for information storage. Optical techniques permit high density information storage much greater than that attainable with conventional magnetic recording. Other advantages of a beam addressed optical mass memory include a reduction in mechanical complexity and power consumption over previous large capacity memories, the reduction of mechanical wear and damage associated with read-write heads contacting the storage medium, and high speed addressing of information in the memory.

Despite the many advantages of optical mass memories, one possible limitation which has arisen is the tendency of certain materials which are used as alterable memory mediums to exhibit a change in their optical properties as a function of time or as a function of write-rewrite cycles. For example, in certain materials, such as alkali halides, the optical absorption for a given wavelength of light can be increased by irradiating or writing on the medium with a shorter wavelength. This written information can be erased by irradiating the medium with a longer wavelength. In this case, three light beams having different wavelengths are used for reading, writing, and erasing. One difficulty which has been encountered is the tendency of potassium bromide (KBr) and other photochromic materials to exhibit a gradual material property change as a function of time. This causes a change in the readout levels associated with a 1 bit and a 0 bit. This change in the readout levels can under certain circumstances cause an ambiguity between 0 and 1 bits.

Another particularly advantageous optical mass memory utilizes a laser to provide Curie point writing on a magnetic film. The information stored is read by the magneto-optic effect. It has been found that certain magnetic films, such as manganese bismuth, produce a "nonerasable" signal after repeated write-rewrite cycling of the film. This non-erasable signal is caused by a gradual degrading of the written portions of the film as the original low temperature crystallographic phase of the film gradually transfers into the high temperature crystallographic phase as a result of repeated write-rewrite cycles. The magneto-optic effect exhibited by the low temperature crystallographic phase film is different from the magneto-optic effect exhibited by film having the high temperature crystallographic phase. Therefore the read-out levels of the "aged" bit which has been subjected to a large number of write-erase cycles are different from the readout signal levels associated with a "young" bit, which has been subjected to only a small number of write-rewrite cycles. Since all bits stored on the memory medium are not subjected to the same number of write-rewrite cycles, a possible ambiguity in readout levels exists.

SUMMARY OF THE INVENTION

The beam addressed optical mass memory of the present invention utilizes an alterable memory medium which exhibits a change in its optical properties as a function of time or as a function of write-rewrite cycles. An alterable reference bit is recorded on the memory medium. Similarly, one or more alterable information bits are recorded. The reference bit is subjected to a number of write-rewrite cycles which is essentially equal to the average number of write-rewrite cycles to which the information bits are subjected.

Information is read out by a differential technique. A light source provides a light beam which is directed to the reference bit and to each of the information bits in a sequential manner. Detector means receive the light beam from the reference bit and from each of the information bits. The detector means produces a reference signal indicative of the intensity of the light beam received from the reference bit and information signals indicative of the light beam received from each of the information bits. Switching means direct the reference signal to a reference channel and sequentially direct each of the information signals to an information channel.

Temporary storage means connected in the reference channel stores the reference signal. Comparing means receive signals from the reference and information channels and compare the reference signal to each of the information signals. In this manner the comparing means produces a plurality of output signals indicative of the comparison of the reference signal and each of the information signals.

DESCRIPTION OF THE PREFERRED EMBODIMENTS

Figure 1:
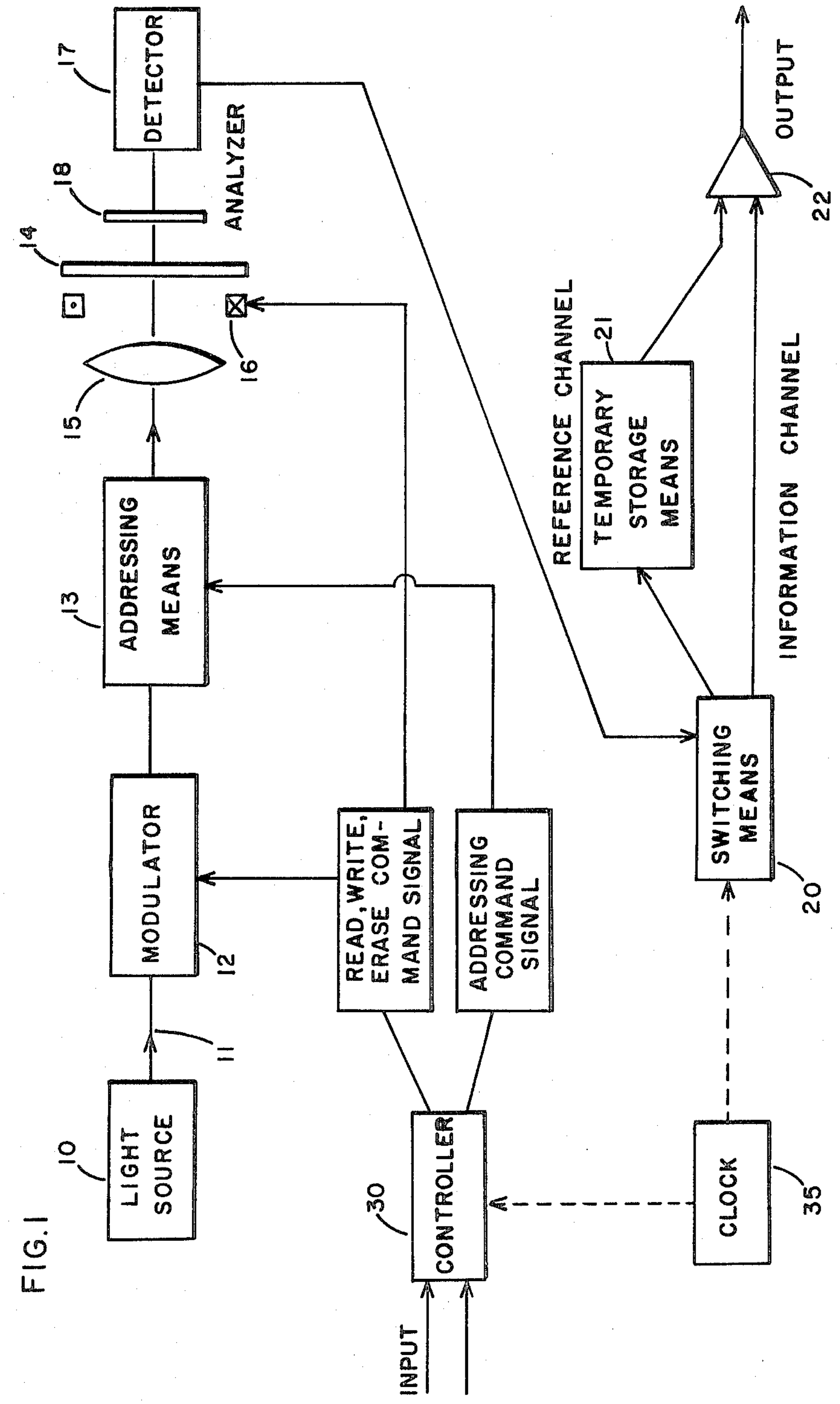
FIG. 1 is a diagrammatic illustration of a beam addressed optical mass memory of the present invention.

FIG. 1 shows a beam addressed optical mass memory utilizing one embodiment of the present invention. For illustrative purposes, the particular system shown utilizes Curie point writing and erasing. Light source 10 provides a polarized light beam 11. The intensity of light beam 11 is controlled by modulator 12, which may be an electro-optic, magneto-optic or acousto-optic device. Addressing means 13 directs light beam 11 to various positions on memory medium 14. Positioned between addressing means 13 and memory medium 14 is focusing means 15 which focuses light beam 11 to a focused light spot.

As shown in FIG. 1, memory medium 14 is a magnetic film such as MnBi. Information is stored on memory medium 14 when the intensity of light beam 11 is sufficient to cause localized heating of a spot to a temperature above the Curie temperature, which is the temperature above which a ferromagnetic material becomes nonmagnetic. Upon cooling to a temperature below the Curie point, the spot returns to the ferromagnetic state. The direction of the magnetization vector of the spot is thus determined by the sum of the magnetization of the surrounding film and the magnetic field supplied by coil 16 when the spot cools through the Curie temperature.

The information stored on memory medium 14 is read out by a magneto-optic effect. For illustrative purposes and discussed with reference to FIG. 1 the Faraday magneto-optic effect is shown. It is to be understood that the Kerr magneto-optic effect, which utilizes light reflected from, rather than transmitted by, memory medium 14 can also be used. Modulator 12 reduces the intensity of polarized light beam 11 to an energy level insufficient to raise the temperature of the medium above the Curie temperature. In this manner inadvertent switching of the magnetic direction of the portion of memory medium 14 which is being interrogated is avoided. Addressing means 13 directs light beam 11 to a particular bit on memory medium 14. Polarized light beam 11 passes through memory medium 14 and is transmitted to a detector 17. The polarization direction of light beam 11 is rotated by memory medium 14. The sense of the direction of magnetization of the bit dictates the sense of rotation of the light polarization direction. Analyzer 18 is positioned between memory medium 14 and detector 17. Analyzer 18 is oriented to pass different intensities of light depending upon the polarization direction of the light.

Figure 2:
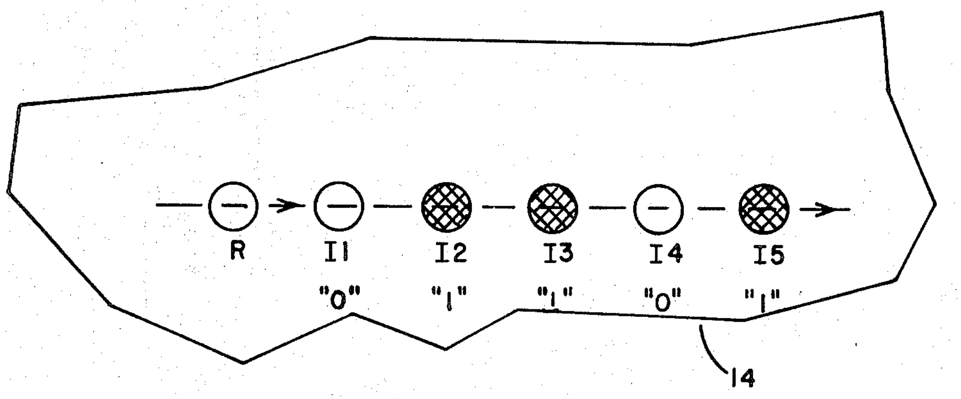
FIG. 2 illustrates a block of erasable recorded bits on a memory medium, including a reference bit and a plurality of information bits.

Before continuing with the description of the system shown in FIG. 1, it is necessary to further discuss memory medium 14, and in particular the manner in which information is stored thereon. Referring to FIG. 2, a portion of memory medium 14 is shown which includes a block of recorded bits. The block of recorded bits includes an alterable reference bit R and a plurality of alterable information bits I1 through I5. Although five information bits have specifically been shown, it is to be understood that the present invention is no way limited to this particular number of information bits. For example, the ratio of information bits to reference bits may be as small as 1:1 or greater than 100:1. The reference bit R has a known state. The light output from reference bit R is compared to the light output of each of the information bits. For illustrative purposes, it is assumed that when the reference bit and an information bit have the same light output a 0 bit results. Alternatively, if the reference and information bits have different light outputs a 1 bit results. As shown in FIG. 2, the binary pattern 01101 is stored by the block of recorded bits.

As discussed previously, many memory materials exhibit a change in optical properties as a function of time or as a function of write-rewrite cycles. This causes a shift in the readout signal level of an individual bit. In the present invention this problem is eliminated by storing information in a differential manner. The alterable reference bit R is subjected to a number of write-rewrite cycles which is essentially equal to the average number of write-rewrite cycles to which any one of the information bits of the block is subjected. Since the optical properties of reference bit R change at an average rate essentially equal to the rate by which the optical properties of the information bits change, the difference in signals between the reference bit and the information bits should remain relatively constant, regardless of the effect of aging on the signal levels themselves.

Within a given block of information, the reference and information bits are read out in a serial manner. The dashed line shown in FIG. 2 illustrates one possible path of light beam 11 as it sequentially interrogates reference bit R and then each of the information bits I1 through I5.

Returning now to FIG. 1, the information stored by the block of recorded bits shown in FIG. 2 is read out in the following manner. Addressing means 13 directs light beam 11 to the reference bit and then to each of the information bits in the sequential manner described above. Detector 17 receives light beam 11 as it is transmitted from the reference bit and then from each of the information bits. Detector 17 produces a reference signal which is indicative of the intensity of the light beam received from reference bit R and then produces a series of information signals indicative of the intensity of the light beam received from each of the information bits. Switching means 20 directs the reference signal to a reference channel. In the reference channel is connected temporary storage means 21, which stores the reference signal. As each of the information signals is received by switching means 20, it is directed to an information channel. Electrical signal comparing means 22 receives the information signals from the information channel and compares the reference signal, as stored in temporary storage means 21, to each of the information signals. Electrical signal comparing means 22 produces a plurality of output signals indicative of the comparison of the reference signal and each of the information signals. The comparison may be the difference between or the ratio of the signals.

In operation, input signals from the computer are received by memory controller 30. The input signals direct the memory to read, write or erase a particular block of information. Controller 30 produces an addressing command signal which causes addressing means 13 to direct light beam 11 to a particular location or locations on memory medium 14. Controller 30 also produces a read, write or erase command signal. The read command signal is directed to modulator 12 to attenuate the intensity of light beam 11 to a level which will not cause excessive localized heating of memory medium 14. This allows a nondestructive readout of the recorded bits.

The write and erase operations are essentially the same. The controller 30 sends an addressing command signal to addressing means 13. In addition a write or erase command signal is directed to modulator 12. When light beam 11 has been positioned to the proper location by addressing means 13, the write or erase command signal causes modulator 12 to allow light beam 11 to have an intensity sufficient to cause a localized temperature increase upon memory medium 14. As described previously, the localized spot is heated to a temperature above the Curie temperature and loses its magnetic properties. Modulator 12 then attenuates light beam 11 to cause cooling of the spot. The direction of the magnetization vector of the spot is determined by the net magnetic field at the spot during cooling. Ordinarily, during the write operation the magnetic field produced by the surrounding portion of memory medium 14 is sufficient to cause magnetic switching. This magnetic field may be supplemented by an external magnetic field applied by coil 16. The application of the magnetic field applied by coil 16 is controlled by the write or erase command signal. The application of the external magnetic field by coil 16 in the same direction as the film background magnetization is generally used during the erase operation.

The operation of the memory is synchronized by clock 35 which provides synchronizing signals to controller 30. As shown in FIG. 1, clock 35 can also supply synchronizing signals to switching means 20 to ensure that the reference signal is correctly directed to the reference channel by switching means 20.

Figure 3:
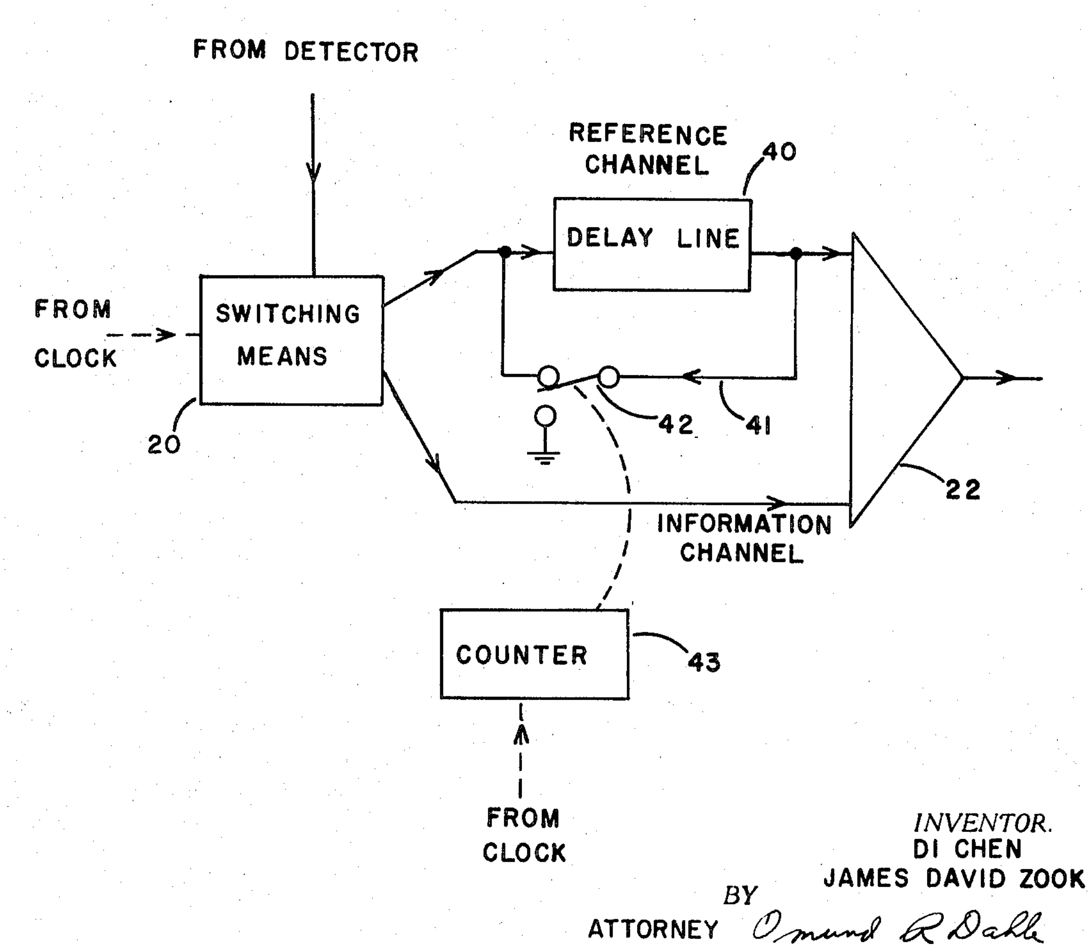
FIG. 3 is a diagrammatic illustration of temporary storage means utilized in one embodiment of the present invention.

FIG. 3 shows one embodiment of temporary storage mans 21. A delay line 40 is positioned in the reference channel. The time delay provided by delay line 40 is equal to the time duration between two successive signals produced by detector 17. A feedback loop 41 redirects the reference signal back to the input of delay line 40. Switch 42 is positioned in feedback loop 41 and either allows the reference signal to be directed to the input of delay line 40 or directs the reference signal to ground. Counter 43 controls the position of switch 42. Counter 43 receives the synchronizing signals from clock 35 and counts the number of synchronizing signals to determine when a new reference signal is directed to the reference channel. When the new reference signal is directed to the reference channel, counter 43 causes switch 42 to direct the old reference signal in the feedback loop to ground. Assuming for illustrative purposes that a block of bits comprises a reference bit and 5 information bits, the embodiment shown in FIG. 3 operates as follows. When a reference signal is received by switching means 20 from detector 17, it is directed to the reference channel. Reference signal R enters delay line 40. At a time duration T later information signal I1 is received by switching means 20 and is directed to the information channel. The time delay caused by delay line 40 is such that reference signal R and information signal I1 are simultaneously received by comparing means 22. Reference signal R is also directed into feedback loop 41 and is redirected to the input of delay line 40. Reference signal R again is delayed by delay line 40 such that comparing means 22 simultaneously receive reference signal R and information signal I2. Information signals I3, I4 and I5 are compared to reference signal R in a similar manner.

Once the block of bits has been read out, a new reference signal from the next block of bits will be directed to the reference channel. It is therefore necessary to remove the old reference signal from the feedback loop 41. Counter 43 receives synchronizing signals from clock 35. When a reference signal is directed to the reference channel, counter 43 begins to count synchronizing signals from clock 35. Since in this example a block consists of six bits, one reference bit and five information bits, counter 43 counts six synchronizing signals from clock 35. A seventh synchronizing signal the corresponds to a new reference signal being directed to the reference channel. Therefore when the seventh synchronizing signal is received by counter 43, counter 43 causes switch 42 to direct the old reference signal in feedback loop 41 to ground.

In embodiments of the present invention in which a block of bits consists of only two bits, one reference bit and one information bit, bits may be read out in either order. Depending on which bit is read first, temporary storage means 21 is positioned in the corresponding channel. In other words, if the information bit is read out first, temporary storage means 21 is positioned in the information channel. One particularly effective temporary storage means is a delay line which delays the signal by the time duration sufficient to cause the reference signal and information signal to be simultaneously received by comparing means 22.

Figure 4:
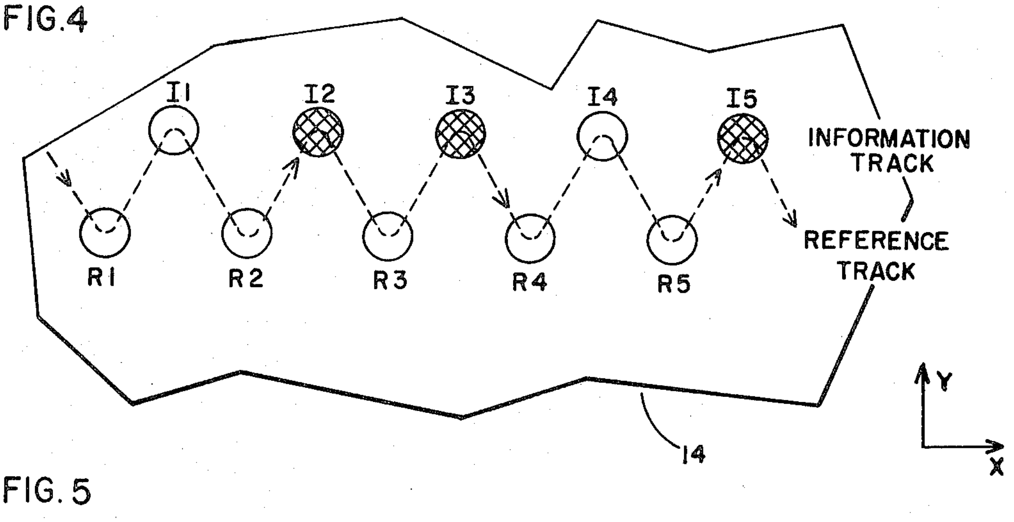
FIG. 4 illustrates the storage of information including a reference track having a plurality of erasable reference bits and an information track having a plurality of erasable information bits.

FIG. 4 shows recorded bits on memory medium 14 in another embodiment of the present invention. This embodiment has particular advantage in a system in which memory medium 14 is a rotating disk or drum. As shown in FIG. 4, the bits are stored in adjacent information and reference tracks. The reference track has a plurality of alterable reference bits R1 through R5. Similarly the information track has a plurality of alterable information bits I1 through I5. The reference and information bits are subjected to essentially the same number of write-rewrite cycles so that they "age" at essentially the same rate.

The dashed line indicates one possible path taken by light beam 11 in reading out the reference and information bits. Light beam 11 is sequentially deflected from a bit in one of the tracks to a bit in the other of the tracks. In one embodiment, this path is achieved by X and Y deflectors which comprise addressing means 13.

A much simpler method of achieving the path shown in FIG. 4 is achieved in a memory in which memory medium 14 rotates. Memory medium 14 moves in the negative X direction thereby causing relative motion of light beam 11 in the positive X direction. Therefore, all that is necessary in order to direct light beam 11 over the desired path is to deflect light beam 11 in the Y direction between the information and reference tracks. In one preferred embodiment of the present invention utilizing a rotating memory medium, addressing means 13 includes a track-to-track deflector which directs the light beam to a particular set of information and reference tracks, and a dither deflector which deflects light beam 11 in the Y direction between the selected information and reference tracks.

Figure 5:
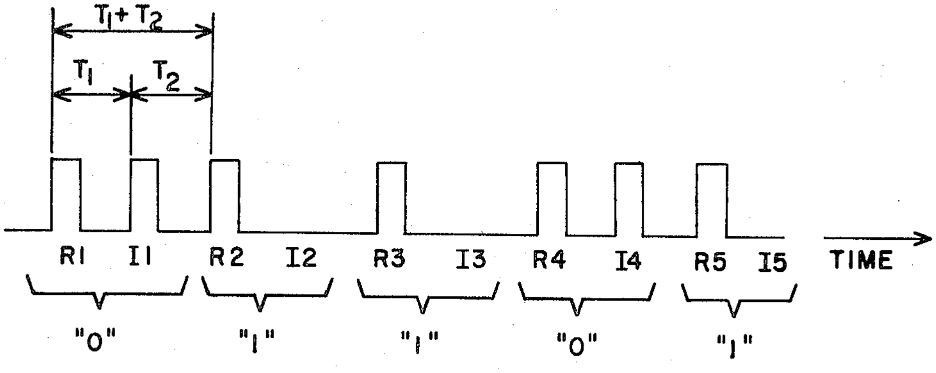
FIG. 5 shows the reference and information signals produced by the detector means when a light beam is sequentially deflected from a bit in one of the tracks shown in FIG. 3 to a bit in the other of the tracks.

FIG. 5 shows the reference and information signals produced by detector 17 as a function of time. Switching means 20 directs reference signal R1 to the reference channel. At a time T1 later switching means 20 directs information signal I1 to the information channel. In one embodiment of the present invention temporary storage means 21 comprises a sample-and-hold circuit which holds the signal level of R1 until reference signal R2 is directed to the reference channel. Electric signal comparing means 22 receives signal I1 from he information channel and compares this signal with the signal level of R1 which is stored by the sample-and-hold circuit. The output signal from electric signal comparing means 22 indicates the difference between reference signal R1 and information signal I1. In the example shown in FIG. 5, the signal level of R1 and I1 is the same and therefore a 0 output signal is produced. A similar comparison of the information bits and their corresponding reference bits produces the bit pattern 01101.

Figure 6:
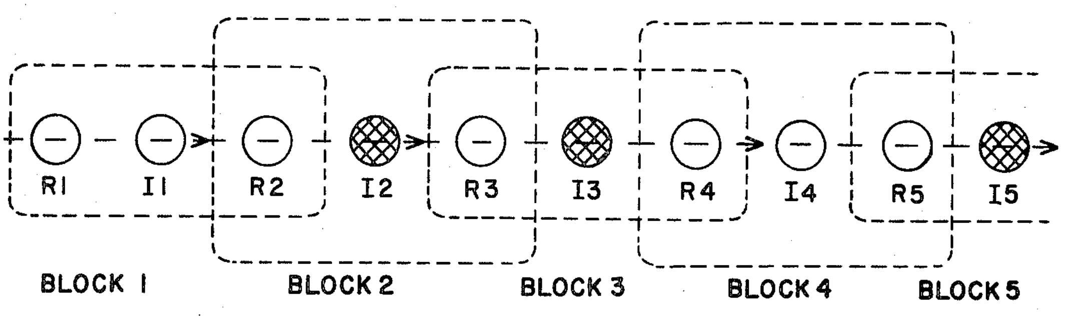
FIG. 6 illustrates the storage of information in blocks of recorded bits comprising two reference bits and one information bit.

FIG. 6 shows recorded bits on memory medium 14 in another embodiment of the present invention. Each block of recorded bits comprises a first and a second alterable reference bit and a first information bit. As in previous examples, the bit pattern 01101 is shown. The bits are read out in a sequential fashion as light beam 11 is directed first to reference bit R1, then to information bit I1, then to reference bit R2 and so on. The signals produced during readout of the information shown in FIG. 6 are identical to that shown in FIG. 5. Signal I1 is produced at a time duration T1 after reference signal R1. Similarly reference signal R2 is produced at a time duration T2 after information signal I1 and at a time duration T1 + T2 after reference signal R1 is produced.

Figure 7:
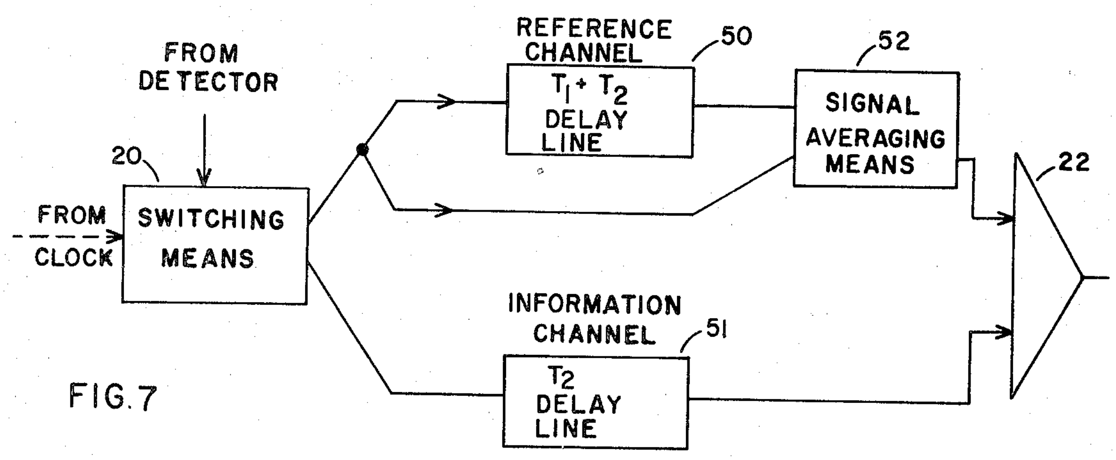
FIG. 7 is a diagrammatic illustration of a system for processing the signals produced by a detector when the blocks of recorded bits shown in FIG. 6 are read out.

FIG. 7 shows a system for handling the signals produced when the bits shown in FIG. 6 are read out. Switching means 20 directs each reference signal to the reference channel and each information signal to the information channel. In operation, switching means 20 directs first reference signal R1 to the reference channel. Reference signal R1 enters a first temporary storage means such as first delay line 50 which provides a time delay of a duration equal to the sum of first time duration T1 and second time duration T2. After time duration T1, first information signal I1 is directed to the information channel, where it is delayed by a time of duration equal to second time duration T2 by a second temporary storage means such as second delay line 51. At a time duration T2 after information signal I1, second reference signal R2 is directed by switching means 20 to the reference channel. Reference signal R2 enters first delay line 50. In addition reference signal R2 is directed to signal averaging means 52. At the same instant, reference signal R1 emerges from first delay line 50 and enters signal averaging means 52, which produces an average reference signal equal to the average of the first and second reference signals R1 and R2. The average reference signal is then received by a comparing means 22 simultaneously with first information signal I1, which emerges from second delay line 51. Hence electrical signal comparing means 22 produces an output signal indicative of the difference or the ratio between first information signal I1 and the average reference signal. The subsequent blocks of information are read out in a similar manner. In addition to being averaged with reference signal R1, reference signal R2 is directed to first delay line 50. Reference signal R2 is delayed by the time duration of T1 + T2 such that reference signals R2 and R3 are simultaneously received by signal averaging means 52.

The use of two reference bits in conjunction with a single information bit further increases system reliability. It should be noted however each reference bit is utilized in two blocks of bits. Therefore, the packing density of the memory is identical to a system to which a block of bits comprises one reference bit and one information bit.

Figure 8:
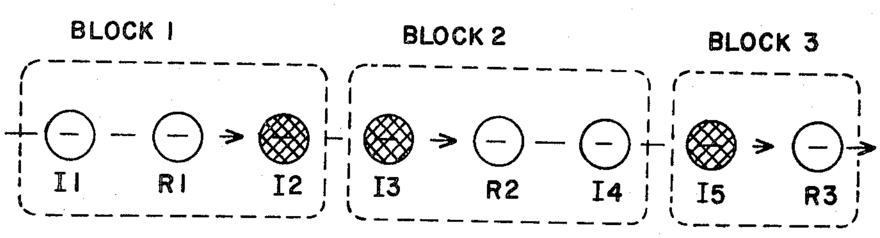
FIG. 8 illustrates the storage of information in blocks of recorded bits comprising two information bits and one reference bit.

FIG. 8 shows still another embodiment of the present invention in which each block of bits comprises two information bits and one reference bit. The dashed line shown in FIG. 8 represents the path of light beam 11 and shows that in each block one information bit is read out, then the reference bit and finally the second information bit is read out. As in previous embodiments discussed, FIG. 8 shows a bit pattern 01101.

Figure 9:
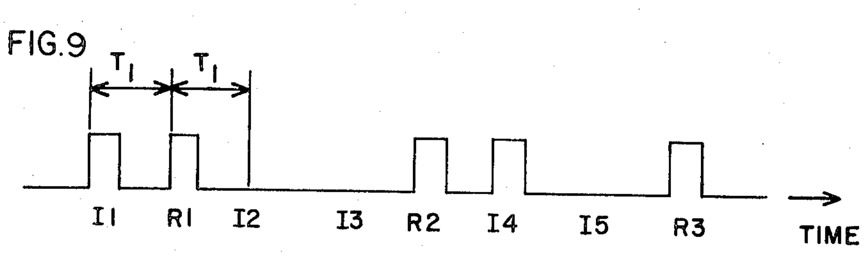
FIG. 9 shows the reference and information signals produced by the detector when the blocks of recorded bits of FIG. 8 are read out.

FIG. 9 shows the signals produced by detector 17 as a function of time. In this embodiment the bits shown in FIG. 8 are evenly spaced such that each signal produced by detector 17 follows the preceding signal after a time duration T1.

Figure 10:
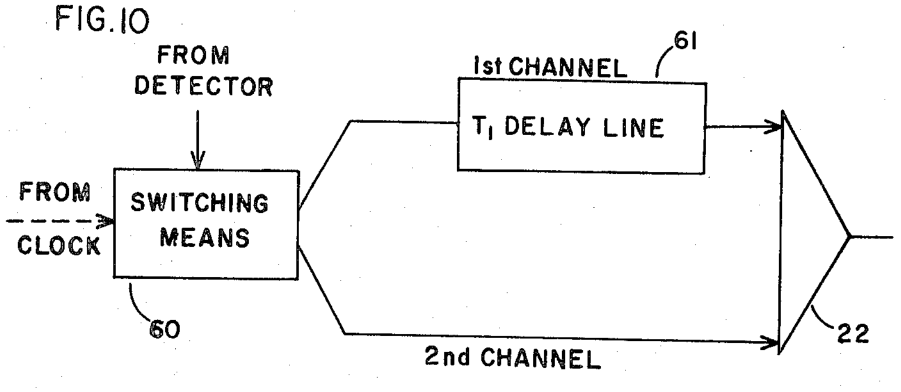
FIG. 10 is a diagrammatic illustration of a system for processing the signals shown in FIG. 9.

FIG. 10 shows a system for processing the signals produced by detector 17 which are shown in FIG. 9. Switching means 60 directs first information signal I1 to a first channel. After a time duration T1 switching means 60 directs reference signal R1 simultaneously to the first channel and a second channel. Then, after time duration T1, second information signal I2 is directed to the second channel.

Located in the first channel is a temporary storage means for storing signals received for a time duration equal to T1. In particular, temporary storage means is shown as delay line 61. However, other temporary storage means can be utilized, such as a sample-and-hold circuit. In operation signal I1 is directed to the first channel and is delayed by delay line 61 for time duration T1. Signal I1 emerges from delay line 61 and is received by comparing means 22 at the same time that reference signal R1 is directed to the second channel and received by electric signal comparing means 22, which produces an output signal indicative of the difference between signals I1 and R1. As stated previously, reference signal R1 is directed to the first channel as well as second channel. It is therefore stored in delay line 61 and emerges to be received by comparing means 22 at the same instant that second information signal I2 is directed into the second channel and received by electric signal comparing means 22. An output signal is produced by electric signal comparing means 22 which is indicative of the comparison between reference signal R1 and second information signal I2. The signals produced by succeeding blocks 2 and 3 are similarly processed.

Although the present invention has been described with respect to an optical mass memory of the Curie point type it can be seen that the inventive concept may be applied to other beam addressed optical mass memories as well. One example of such a beam addressed optical mass memory utilizes photochromic material which exhibits a photoabsorptive effect. In that case, it will be understood that certain elements shown in FIG. 1 are not required. For example coil 16 is not required to achieve writing or erasing. In addition since a photoabsorptive, rather than a magneto-optic, effect is used to read out information, analyzer 18 is not necessary.

The embodiments of the invention in which an exclusive property or right is claimed are defined as follows:

1. In a beam addressed optical mass memory having an alterable memory medium exhibiting a change in its optical properties as a function of write-rewrite cycles, and having means for writing and rewriting bits on the memory medium, an improvement comprising:

a block of recorded bits comprising,
  a plurality of alterable information bits recorded on the memory medium, and
  an alterable reference bit recorded on the memory medium, the reference bit being subjected to a number of writ-rewrite cycles essentially equal to the average number of write-rewrite cycles to which one of the plurality of information bits is subjected, light source means for providing a light beam, light beam addressing means for directing the light beam to the reference bit and then to each of the plurality of information bits, radiation detector means for receiving a light beam from the reference bit and from each of the plurality of information bits and for producing a reference signal indicative of the intensity of the light beam received from the reference bit and then information signals indicative of the intensity of the light beam received from each of the plurality of information bits, switching means for directing the reference signal to a reference channel and sequentially directing each of the information signals to an information channel, temporary storage means connected in the reference channel for storing the reference signal until each of the information signals is directed to the information channel, and electric signal comparing means for receiving signals from the reference and information channels and comparing the reference signal to each of the information signals and producing a plurality of output signals indicative of the comparison of the reference signal and each of the information signals.

2. The invention as described in claim 1 wherein the erasable medium is a magnetic film.

3. The invention as described in claim 2 wherein the magnetic film is a manganese bismuth film.

4. In a beam addressed optical mass memory having an alterable memory medium exhibiting a change in its optical properties as a function of write-rewrite cycles, and having means for writing and rewriting bits on the memory medium, an improvement comprising:

a reference track on the memory medium having a plurality of alterable reference bits, an information track on the memory medium having a plurality of alterable information bits, the information track being adjacent the reference track, the reference and information bits being subject to essentially the same number of write-rewrite cycles, light source means for providing a light beam, light beam addressing means for sequentially deflecting the light beam from a bit in one of the tracks to a bit in the other of the tracks, radiation detector means for receiving the light beam from each of the reference and information bits and alternatively producing a reference signal indicative of the intensity of the light beam received from a reference bit and then an information signal indicative of the intensity of the light beam received from an information bit, switching means for directing the reference signal to a reference channel and the information signal to an information channel, temporary storage means connected in the reference channel for storing the reference signal until another reference signal is directed to the reference channel, and electrical signal comparing means for receiving signals from the reference and information channels and producing an output signal indicative of the comparison of the reference and the information signals.

5. In a beam-addressed optical mass memory having an alterable memory medium exhibiting a change in its optical properties as a function of write-rewrite cycles, and having means for writing and rewriting bits on the memory medium, an improvement comprising:

a block of recorded bits comprising
  an alterable information bit recorded on the memory medium, and
  an alterable reference bit recorded on the memory medium, the reference bit being subjected to a number of write-rewrite cycles essentially equal to the number of write-rewrite cycles to which the information bit is subjected, light source means for providing a light beam, light beam addressing means for directing the light beam to one of the information and reference bits and then to the other of the bits, radiation detector means for receiving the light beam from the reference bit and from the information bit and for producing a reference signal indicative of the intensity of the light beam received from the reference bit and an information signal indicative of the intensity of the light beam received from the information bit, switching means for directing the reference signal to a reference channel and the information signal to an information channel, temporary storage means connected in one of the information and reference channels for storing the signal directed to that channel until a signal is directed to the other channel, and electric signal comparing means for simultaneously receiving signals from the reference and information channels and producing an output signal indicative of the comparison of the reference signal and the information signal.

6. In a beam-addressed optical mass memory having an alterable memory medium exhibiting a change in its optical properties as a function of write-rewrite cycles, and having means for writing and rewriting bits on the memory medium, an improvement comprising:

a block of recorded bits comprising first and second alterable reference bits recorded on the memory medium, and a first alterable information bit recorded on the memory medium, light source means for providing a light beam, light beam addressing means for directing the light beam to the first reference bit, then to the first information bit, and then to the second reference bit, radiation detector means for receiving the light beam from the block of recorded bits and for producing a first reference signal indicative of the intensity of the light beam received from the first reference bit, then producing after a first time duration T1 after the first reference signal a first information signal indicative of the intensity of the light beam received from the first information bit, and producing after a second time duration T2 after the first information signal a second reference signal indicative of the intensity of the light beam received from the second reference bit, switching means for directing the first reference signal to a reference channel, then directing the first information signal to an information channel, and then directing the second reference signal to the reference channel, first temporary storage means connected in the reference channel for storage of the reference signals for a time duration equal to the sum of the first time duration T1 and the second time duration T2, second temporary storage means connected in the information channel for storing the first information signal for a time duration equal to second time duration T2, signal averaging means connected in the reference channel for receiving the first reference signal from the second temporary storage means and for receiving the second reference signal prior to its storage in the second temporary storage means, the signal averaging means producing an average reference signal equal to the average of the first and second reference signals, and electric signal comparing means for receiving the first information signal from the information channel and the average reference signal from the reference channel and for producing an output signal indicative of the comparison of the first information signal and the average reference signal.

7. The invention as described in claim 6 wherein the first temporary storage means comprises a delay line for providing a time delay of a duration equal to second time duration T2.

8. The invention as described in claim 6 wherein the second temporary storage means comprises a delay line for providing a time delay of a duration equal to the sum of the first time duration T1 and the second time duration T2.

9. In a beam addressed optical mass memory having an alterable memory medium exhibiting a change in its optical properties as a function of write-rewrite cycles, and having means for writing and rewriting bits on the memory medium, an improvement comprising:

a block of recorded bits comprising first and second alterable information bits recorded on the memory medium, and an alterable reference bit recorded on the memory medium, the reference bit being subjected to a number of write-rewrite cycles essentially equal to the average number of write-rewrite cycles to which the first and second information bits are subjected, light source means for providing a light beam, light beam addressing means for directing the light beam to the first information bit, then to the reference bit and then to the second information bit, radiation detector means for receiving the light beam from the first information bit, from the reference bit and from the second information bit and for producing a first information signal indicative of the intensity of the light beam received from the first information bit, then producing after a time duration T1 after the first information signal a reference signal indicative of the intensity of the light beam received from the reference bit, and then producing after time duration T1 after the reference signal a second information signal indicative of the intensity of the light beam received from the second information bit, switching means for directing the first information signal to a first channel, for directing the reference signal simultaneously to the first and a second channel, and for directing the second information signal to the second channel, temporary storage means connected in the first channel for storing signals directed to the first channel for a time duration T1, and electric signal comparing means for receiving signals from the first and second channels and producing an output signal indicative of the comparison of the signals received, whereby the electric signal comparing means simultaneously receives the stored first information signal from the first channel and the reference signal from the second channel and produces a first output signal, and after a time duration T1 receives the reference signal from the first channel and the second information signal from the second channel and produces a second output signal.

* * * * *